March 25, 1958     E. H. SHAFF     2,827,880
BALANCED REVERSING AIR VALVE STRUCTURE
Filed Dec. 1, 1954     2 Sheets-Sheet 1
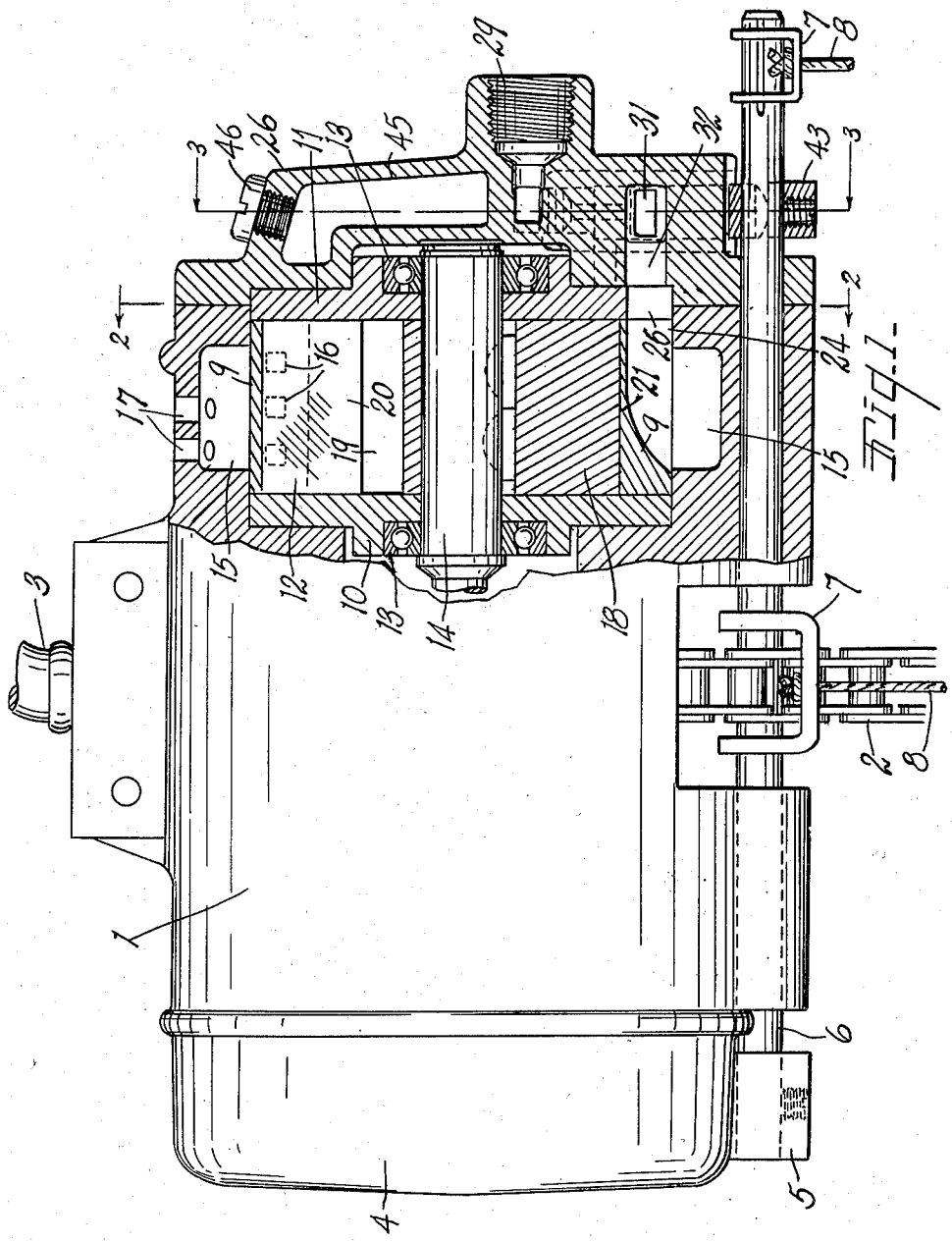
INVENTOR.
Ernest H. Shaff
BY Otis A. Earl
ATTORNEY.

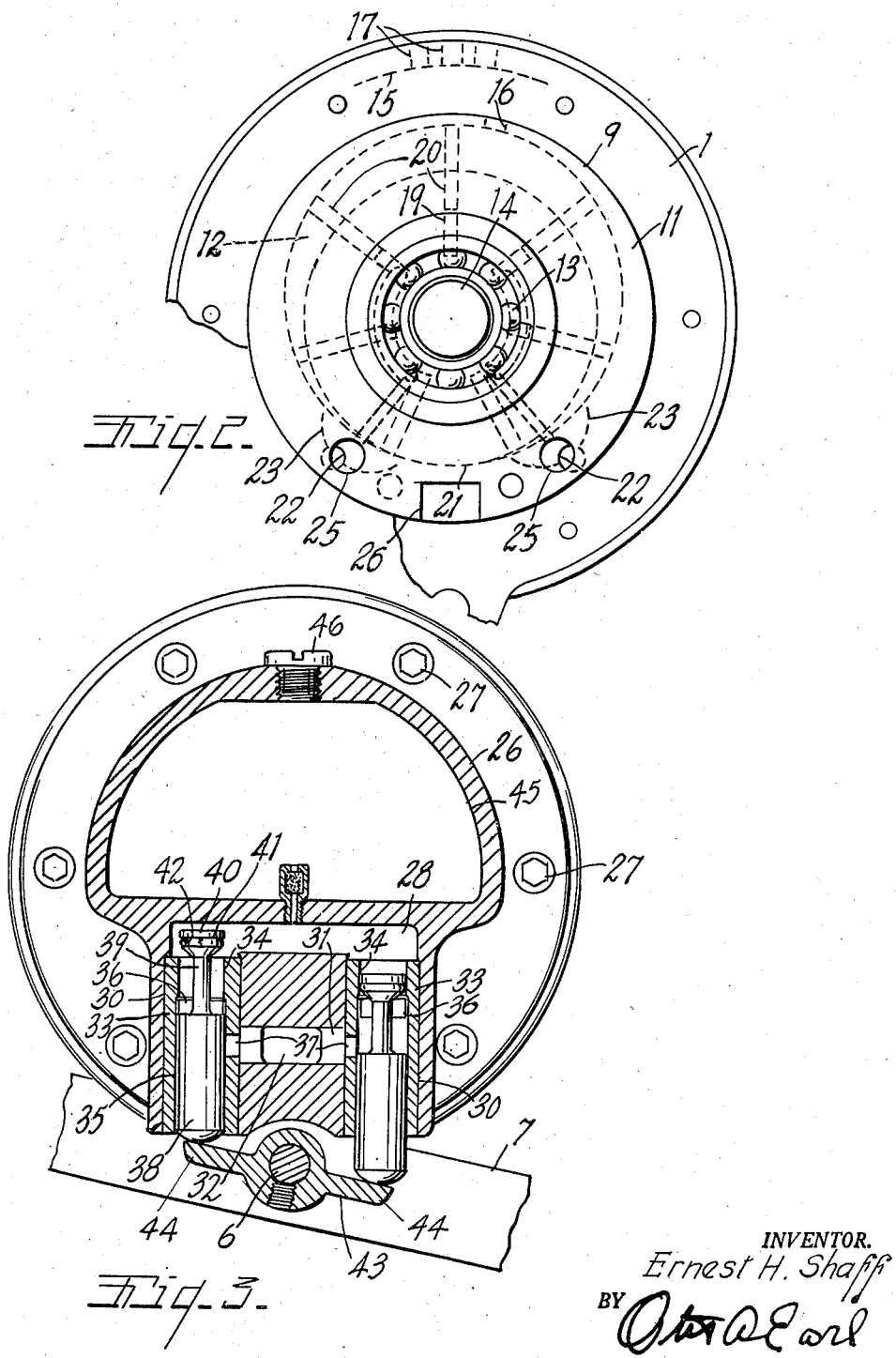

United States Patent Office 2,827,880
Patented Mar. 25, 1958

2,827,880

BALANCED REVERSING AIR VALVE STRUCTURE

Ernest H. Shaff, Lake Worth, Fla.

Application December 1, 1954, Serial No. 472,375

1 Claim. (Cl. 121—39)

This invention relates to improvements in balanced reversing air valve structure. The principal objects of this invention are:

First, to provide two oppositely actuated valve members for alternately opening two pairs of inlet and exhaust ports to supply and exhaust passages so that the pressure of the air on the valve members will be approximately balanced at all times.

Second, to provide a reversing valve assembly for a pneumatic device in which force necessary for operating the valves remains constant in all positions of the valves so there is no tendency for the valves to over travel as they are manually operated.

Third, to provide a balanced valve assembly that is easy and inexpensive to manufacture and assemble in a valve body of irregular and relatively complicated shape.

Other objects and advantages of the invention will be apparent from a consideration of the following description and claim. The drawings illustrate a highly practical embodiment of the invention.

Fig. 1 is a side elevational view of an air operated hoisting machine with a valve assembly embodying the invention incorporated therein. The air motor and valve section of the machine are illustrated in vertical axial cross section.

Fig. 2 is an end elevational view of the hoist with end plate and valve housing removed.

Fig. 3 is a transverse cross sectional view taken along the plane of the line 3—3 in Fig. 1.

The air hoist illustrated is one type of machine to which the valve apparatus is particularly adapted. However, the valve apparatus is useful in connection with other machines and applications and the invention is not limited to the use in combination with an air operated hoist.

The hoist includes a body 1 in which gears and other apparatus not shown are mounted for oppositely actuating a lift chain 2. A suspension hook for the body is shown in part at 3 and a brake housing 4 at one end of the hoist contains brake mechanism for holding the chain in any given position. The brake mechanism is actuated by a member 5 secured to the end of an operating rock shaft 6. The shaft 6 is journaled in the bottom of the body and extends beyond the opposite end of the hoist to a cross bar 7 having pull cords 8 hanging therefrom for controlling the hoist.

The end of the body 1 is chambered to receive a rotor cylinder 9 and end plates 10 and 11 which define a rotor chamber 12. The end plates 10 and 11 have bearings 13 mounted therein for the rotor shaft 14 and the rotor chamber 12 is eccentric with respect to the shaft. An annular exhaust passage 15 is formed in the body around the rotor cylinder and the rotor chamber communicates therewith through ports 16. The exhaust passage 15 is vented to the exterior of the body through ports 17.

Keyed to the shaft 14 in the chamber 12 is a cylindrical rotor 18 having radial slots 19 receiving the vanes 20. The rotor seals against the bottom of the rotor cylinder at 21 and the vanes project variably to sweep the inside of the rotor cylinder. A pair of inlet ports 22 formed in rotor cylinder at opposite sides of the line of contact 21 between the rotor and the rotor cylinder (see Fig. 2) communicate with arcuate pockets 23 formed in the inside of the rotor cylinder. An exhaust passage 24 is cut in the exterior of the bottom of the rotor cylinder to communicate with the annular exhaust passage 15 and open to the end of the rotor cylinder. The outer end plate 11 has inlet ports 25 formed therein registering with the inlet ports 22 and an exhaust passage 26 communicating with the exhaust passage 24. The foregoing structure is generally conventional in machines of this type.

The head plate 26 is secured to the end of the body 1 by screws 27 and is in the form of a casting forming a valve housing. A transversely extending inlet header 28 in the housing is adapted to be supplied with air through a threaded coupling 29. A pair of spaced vertical bores 30 open between the bottom of the housing and the header 28. A transverse exhaust header 31 formed in the housing below the inlet header opens to the bores 30 and has an exhaust passage 32 registering with the exhaust port 25 in the end plate 11.

Pressed into each bore 30 is a sleeve 33 having an inner end 34 of reduced internal diameter and an outer end 35 of relatively larger internal diameter. The sleeves and the valve housing have inlet ports 36 formed therein at the outer ends of the reduced portions 34 registering with the inlet ports 24 in the rotor end plate 11. Spaced axially outwardly of the bores 30, the sleeves 33 are provided with exhaust ports 37 opening to the exhaust header 31.

Slidable in each of the sleeves 33 is a valve member having a cylindrical outer body 38 that is guided in the enlarged outer portion of the sleeve. A stem 39 of substantially reduced diameter extends from the valve body to a head 40 that fits in the reduced inner end 34 of the sleeve. The head 40 is annularly grooved as at 41 and a rubber O ring 42 is snapped into the groove to slidably and sealingly engage the reduced inner portion of the sleeve.

A valve operating member 43 is fixed to the shaft 6 below the valve housing. The operating member has oppositely projecting arms 44 that engage the outer ends of the valve bodies 38 to control the valves as the shaft 6 is rocked by the cords 8.

The upper portion of the valve housing defines an oil reservoir 45 from which oil may drip through the porous plug 46 into inlet header 28.

The valve assembly as described is easy to manufacture and assemble inasmuch as most of the valve housing can be formed as a casting. The only machining necessary is a facing operation on the inner side of the housing, boring of the bores 30 and drilling and tapping the openings in the oil reservoir. All the ports and passages in the housing may be cored. The more exacting operations of boring and counterboring the valve sleeves and turning the valve members are easily performed on the separate small parts that can easily be assembled in the housing.

In operation of the valve assembly the full inlet pressure of the inlet header is applied against the head of the valve that is closed. The force of this pressure is balanced on the valve that is open by air pressure acting against the inner end of the body portion 38 of the open valve. While there is a slight throttle action and reduction in pressure as the air passes the open O ring of the open valve and while the stem 39 reduces the effective area of the end of the valve, the relatively enlarged size of the valve body with respect to the size of the valve head results in a substantially balanced force on the valves at all times. As a result it is easy to regulate the valve and the hoist controlled thereby.

Having thus described the invention, what is claimed as new and is desired to be secured by Letters Patent is:

In an air operated device having a rotary pneumatic motor with air passages opening to opposite sides of the rotor chamber thereof for oppositely driving the motor and for exhausting air trapped by the driven side of the rotor, the combination of an integral valve housing on the end of said motor and having a header with an air supply connection formed therein, said housing having spaced bores formed therein and opening between the exterior of the housing and one side of said header, the opposite wall of said header from said bores being imperforate, sleeves fitted within said bores and having inner ends of reduced internal diameter, registering inlet ports formed in said housing and said sleeves at the outer ends of the reduced portions of said sleeves and communicating with the passages in said motor, valve members having cylindrical bodies slidable in the outer ends of said bores, inwardly projecting stems of reduced diameter on said valve bodies, heads on the ends of said stems sealingly slidable in the reduced inner ends of said bores, deformable sealing O rings mounted around said heads, said housing having an exhaust passage formed therein, said sleeves having exhaust ports formed therein and spaced outwardly from said inlet ports and communicating with said exhaust passage, said exhaust ports being located to be closed by said valve bodies when said heads are projected through the inner ends of said sleeves into said header and to be exposed by said valve bodies when said valve heads are positioned in said reduced inner ends of said sleeves, and means mounted on said housing engaged with the outer ends of said valve bodies to alternately move said valve bodies into said sleeves.

References Cited in the file of this patent

UNITED STATES PATENTS

| | | |
|---|---|---|
| 440,448 | Turner | Nov. 11, 1890 |
| 475,455 | Lavinia | May 24, 1892 |
| 477,088 | Mitzlaff | June 14, 1892 |
| 679,533 | Moore | July 30, 1901 |
| 2,321,267 | Werff | June 8, 1943 |
| 2,445,585 | Shaff | July 20, 1948 |
| 2,638,122 | Ludwig | May 12, 1953 |